United States Patent
Ghannam et al.

(10) Patent No.: US 11,794,763 B2
(45) Date of Patent: Oct. 24, 2023

(54) SYSTEMS AND METHODS FOR PROVIDING DRIVER ALERTS INSIDE A NEIGHBORHOOD

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 17/125,205

(22) Filed: Dec. 17, 2020

(65) Prior Publication Data

US 2022/0194402 A1   Jun. 23, 2022

(51) Int. Cl.
*B60W 50/14* (2020.01)
*B60W 40/04* (2006.01)
(Continued)

(52) U.S. Cl.
CPC ............ *B60W 50/14* (2013.01); *B60W 40/04* (2013.01); *G06F 16/1834* (2019.01);
(Continued)

(58) Field of Classification Search
CPC ................ B60W 50/14; B60W 40/04; B60W 2554/4041; B60W 2556/45; H04W 4/44; G06F 16/2322; G06F 16/1834
See application file for complete search history.

(56) References Cited

U.S. PATENT DOCUMENTS 11,157,002 B2 * 10/2021 Poornachandran ..... H04L 67/12
2019/0049966 A1 * 2/2019 Poornachandran .... G06Q 10/00
(Continued)

FOREIGN PATENT DOCUMENTS

CN           102546696 A       7/2012

OTHER PUBLICATIONS

Wikipedia, Blockchain, Dec. 16, 2020, https://en.wikipedia.org/wiki/Blockchain (Year: 2020).*
(Continued)

*Primary Examiner* — Tarek Elarabi
(74) *Attorney, Agent, or Firm* — Brandon Hicks; Eversheds Sutherland (US) LLP

(57) ABSTRACT

The disclosure generally pertains to systems and methods for providing driver alerts inside a neighborhood. In an example embodiment, a neighborhood area network of computers is used to convey to a driver in the neighborhood, a driver alert about a driving impediment present on a road outside a residence. The driving impediment, which may be, for example, a vehicle, a trash receptacle, or an individual, is detected by a detection device (a camera, for example). The detection device informs a computer located in the residence of the driving impediment. The computer then communicates via the neighborhood area network with a computer in the vehicle to alert the driver. In some implementations, information pertaining to driving impediments in the neighborhood may be entered into a distributed ledger by using a blockchain mode of operation. The computer in the vehicle can access the distributed ledger to obtain this information.

18 Claims, 4 Drawing Sheets

(51) Int. Cl.
    *G06F 16/23*         (2019.01)
    *H04W 4/44*        (2018.01)
    *G06F 16/182*      (2019.01)

(52) U.S. Cl.
    CPC .......... *G06F 16/2322* (2019.01); *H04W 4/44* (2018.02); *B60W 2554/4041* (2020.02); *B60W 2556/45* (2020.02)

(56) References Cited

U.S. PATENT DOCUMENTS

| | | | | |
|---|---|---|---|---|
| 2020/0023846 A1* | 1/2020 | Husain | ................ | H04W 4/027 |
| 2021/0291819 A1* | 9/2021 | Smith | ............... | B60W 30/0956 |

OTHER PUBLICATIONS

Shrestha et al, "A new type of blockchain for secure message exchange in VANET", Digital Communications and Networks Science Digest, vol. 6, Issue 2, Apr. 19, 2019, pp. 177-186.
Khan et al, "Secure Trust-Based Blockchain Architecture to Prevent Attacks in VANET", MDPI, vol. 19, Issue 22, Nov. 14, 2019, 27 pages.

\* cited by examiner

SYSTEMS AND METHODS FOR PROVIDING DRIVER ALERTS INSIDE A NEIGHBORHOOD

BACKGROUND

Commuting to work is a routine that many of us perform without giving much thought. A commuter typically follows a particular route when heading to work in the morning and may follow the same route when returning home in the evening (barring traffic issues or other unforeseen situations). After commuting regularly over a period of time, the commuter becomes very familiar with the route and soon begins to drive in a reflexive manner without paying too much attention to various features on the driving route. This mode of driving is sometimes referred to as driving on autopilot. Driving on autopilot may be similarly performed on various other routes and for various other reasons as well, such as, for example, when a driver is exhausted after a long drive.

Driving on autopilot becomes even more pronounced in familiar areas, such as a neighborhood in which the commuter resides. Thus, for example, a weary commuter driving on autopilot on a road inside his/her neighborhood may fail to notice some debris that was not present in the morning when he/she set off to work or may fail to notice the presence of a large vehicle being used to carry out repairs on a pothole in the road.

Distracted driving is another form of driving where a driver is distracted by something and is not paying adequate attention to the road.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
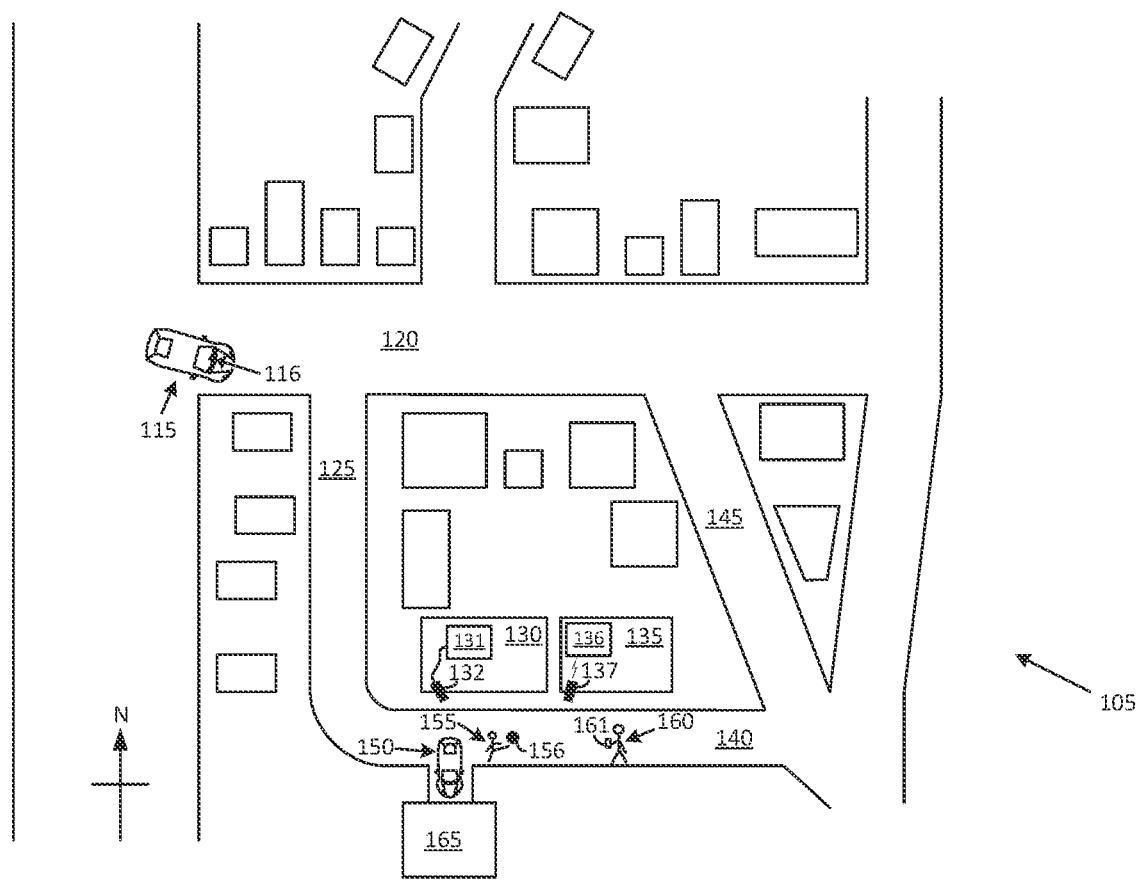
FIG. 1 illustrates an example neighborhood that employs a system to provide driver alerts in accordance with an embodiment of the disclosure.

The systems and methods disclosed herein generally pertain to providing driver alerts in a neighborhood. In an example embodiment, a neighborhood area network of computers is used to convey, to a driver in the neighborhood, a driver alert about a driving impediment that may be present on a road outside a residence in the neighborhood. The driving impediment, which may be, for example, a vehicle, a trash receptacle, or an individual, is detected by a detection device (a camera, for example). The detection device informs a computer located in the residence of the driving impediment. The computer then communicates via the neighborhood area network with a computer in the vehicle to alert the driver. In some implementations, information pertaining to driving impediments may be entered into a distributed ledger that is provided in a distributed computer system. The information may be entered into the distributed ledger by any computer of the distributed computer system by using a blockchain mode of operation. The computer in the vehicle can access the distributed ledger to obtain this information.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Certain words and phrases are used herein solely for convenience and such words and terms should be interpreted as referring to various objects and actions that are generally understood in various forms and equivalencies by persons of ordinary skill in the art.

FIG. 1 illustrates an example neighborhood 105 that employs a system to provide driver alerts in accordance with an embodiment of the disclosure. The neighborhood 105 generally represents any group of residences, such as, for example, a subdivision, an apartment complex, a townhome complex, a city block, or a small town. In accordance with the disclosure, computers that may be located in some, or all, of the residences are communicatively coupled to each other via a communications network that is generally referred to in this disclosure as a neighborhood area network (NAN). A NAN may also be referred to by various other names, such as a neighborhood area network, a neighborhood area communication network, a near-me area network, and a wireless local area network.

In broad terms, the NAN in accordance with the disclosure may be described as a distributed communication network that supports wireless communications between various devices that may be located in various places in the neighborhood 105. The devices, may, for example, be located in residences of the neighborhood 105, in public areas of the neighborhood 105 (entryways, common areas, roads etc.), in various vehicles traveling inside the neighborhood 105, and/or may be carried by various individuals inside the neighborhood 105. Some, or all, of these devices, may be Internet of Things (IoT) devices that are configured to communicate with each other via the NAN. Unlike a local area network (LAN), the various devices of the NAN do not have to share a common broadcast domain and can have various network infrastructures supported by various service providers.

A few examples of devices that may be located in the various residences in the neighborhood 105 can include personal computers, laptop computers, personal communication devices, and security devices (for example, cameras mounted on exterior walls and/or fixtures of a residence). A few examples of devices that may be located in various public areas of the neighborhood 105 can include monitoring devices and security devices (such as cameras installed in common areas and on roadside fixtures). A few examples of devices that may be located in various vehicles traveling inside the neighborhood 105 can include a vehicle computer, an infotainment system, and a wireless communication system (a Bluetooth® communication system, for example). A few examples of personal communication devices can include cellular phones, pagers, laptop computers, and tablet computers that can share information (images of driving impediments, for example) with the various devices located in the neighborhood.

Providing of driver alerts by the system in accordance with the disclosure may be described in an example scenario, where a vehicle 115 is entering the neighborhood 105 via a road 120. The driver of the vehicle 115 may be returning home from work and is very familiar with the neighborhood 105. Consequently, the driver may resort to driving on autopilot without looking around too much or paying too much attention to various objects. The driver lives in a residence 135 that is located on a road 140 inside the neighborhood 105. A camera 137 that is mounted upon a wall of the residence 135 is arranged to monitor activity outside the residence 135. The monitoring activity can include capturing images of scenes outside the residence 135 and propagating the images to a computer 136 located inside the residence 135. In this example case, the camera 137 can be a video camera that produces video clips or streaming video in a digital format. The video clips and/or streaming video may be propagated (wirelessly or via a transmission cable) to the computer 136 in the form of digital data that can be evaluated by the computer 136 for various purposes. In other cases, the camera 137 may be replaced by any of various kinds of detection devices, such as, for example, a motion sensor, an infrared sensor, or a radar detector, for performing various types of detection activities.

A residence 130 that is located adjacent to the residence 135 also has a detection device in the form of a camera 132 that is arranged to capture images of scenes outside the residence 130 and to propagate the images to a computer 131 located inside the residence 130. An occupant of a residence 165 that is located across the road 140 from the residence 130 has a vehicle 150 that is used as a family vehicle, and is generally parked on a driveway of the residence 165. The resident is a careless driver and often parks the vehicle 150 in an inappropriate manner. The resident also has a kid 155 who likes to play on the road 140 with a ball 156.

In the scenario depicted in FIG. 1, the vehicle 150 is poorly parked with a rear portion of the vehicle 115 projecting on to the road 140 and partially blocking traffic travelling east on the road 140. The kid 155 has kicked the ball 156 on to the road 140 and is in the process of retrieving it. The rear portion of the vehicle 150 blocks the kid 155 and the ball 156 from the view of motorists turning left on to the road 140 from the road 125. In this example scenario, the vehicle 150, the kid 155, and the ball 156 are three examples of driving impediments in accordance with the disclosure. It is desirable that a driver, particularly a driver driving on autopilot, be made aware of various types of such driving impediments in accordance with the disclosure. Other examples of driving impediments can include, for example, a utility vehicle parked on a road for carrying out repairs to the road and/or on roadside fixtures (a traffic light, for example), a trash receptacle (a trash can on the road, for example), a dumpster truck, an emergency vehicle, and a damage to a road surface (a newly created pothole, for example).

When returning from work, the driver of the vehicle 115 usually travels on the road 120 after entering the neighborhood 105, then turns right onto a road 125, and left onto the road 140 to reach his/her residence 135.

The camera 137 mounted upon the wall of the residence 135 captures one or more images of the scene in front of the residence 135 and transmits the images to the computer 136 inside. The computer 136 may execute a software application that can generate a driver alert in accordance with the disclosure. The software application may be provided to the driver of the vehicle 115 who lives in the residence 135, by various entities, such as, for example, a neighborhood organization (a home owners' association, for example).

Several actions may be associated with receiving and operating the software application on the computer 136, such as, for example, signing of a contract with various terms and conditions. The terms and conditions may outline details about performing actions, such as allowing the computer 136 to cooperate with other devices via the NAN and/or privacy issues, such as allowing identification of various vehicles and/or individuals in the neighborhood. In one implementation, the computer 136 may be used to analyze the contract and provide recommendations to the driver who lives in the residence 135. The analysis may be carried out by using artificial intelligence (AI) techniques.

The software application that is executed on the computer 136 may evaluate the images provided by the camera 137 in order to determine if a driver alert is to be generated. The evaluation may involve using image processing procedures to identify a presence of the vehicle 150, the kid 155, and the ball 156 on the road 140. In one implementation, the computer 136 may evaluate a license plate of the vehicle 150 in order to identify the owner of the vehicle 115. The computer 136 may further employ facial recognition techniques to identify the kid 155 and template matching techniques to identify objects, such as the ball 156.

The computer 136 may then determine a risk factor associated with the presence of the vehicle 150, the kid 155, and/or the ball 156 on the road 140. For example, the computer 136 may assign a risk factor of 2 (based on a risk factor scale ranging from 1 to 10) to the vehicle 150 because residents of the neighborhood 105 are generally aware that the vehicle 150 is typically parked in this inappropriate manner and are accustomed to driving around the vehicle 150. The computer 136 may assign a risk factor of 8 to the kid 155 because the vehicle 150 is restricting the view of the kid 155 to drivers traveling east on the road 140. The computer 136 may further assign a risk factor of 9 to the ball 156 because the ball 156 may bounce unpredictably on the road 140 and cause drivers traveling in either direction on the road 140 to carry out abrupt avoidance maneuvers.

The various risk factors associated with the various objects present on the road 140 may then be compared by the computer 136 to a threshold risk factor. In one case, the threshold risk factor may be a preset risk factor that is uniformly applied by all computers that are coupled to the neighborhood area network and are participating in the driver alert system in accordance with the disclosure. In another case, the threshold risk factor may be set on an individual basis by various residents associated with various computers that are coupled to the neighborhood area network and are participating in the driver alert system in accordance with the disclosure. Some residents may be more risk averse than others and may prefer to set a threshold risk factor based on their personal preference. For example, in such a scheme, the driver of the vehicle 115 may set a threshold risk factor of 5 out of 10, whereas the individual residing in the residence 165 may set a threshold risk factor of 8 out of 10.

In one embodiment in accordance with the disclosure, the computer 131 may determine that one or more risk factors associated with the presence of the vehicle 150, the kid 155, and/or the ball 156 on the road 140 exceeds a threshold risk factor. If so, the computer 136 communicates wirelessly with a device 116 located in the vehicle 115, and provides information that may be evaluated by the device in order to issue a driver alert to the driver of the vehicle 115. In some implementations, the computer 136 may wirelessly transmit the information to one or more other vehicles as well.

The device 116 located in the vehicle 115 may be any of various devices, such as, for example, a vehicle computer, an infotainment system, and/or an apparatus that is configured for producing driver alerts in the vehicle 115. The information provided by the computer 136 to the device 116 may include, for example, a message indicating that a threshold risk factor has been exceeded, a location of the object causing the risk, and/or a nature of the risk. The driver alert provided by the device 116 can take any of various forms, such as, for example, a beeping sound emitted by an audio system to prompt the driver to be more alert when driving inside the neighborhood 105, an audible warning message broadcast through an infotainment system, or an image of the object(s) that is the source for the driver alert.

In another embodiment in accordance with the disclosure, a driver alert that is generated based on information provided by the computer 136 may be validated and/or confirmed on the basis of one or more other computers that evaluate other images obtained via detection devices coupled to the other computers. For example, the computer 131 in the residence 130 may receive images captured by the camera 132 mounted on a wall of the residence 130. Though the angle of view may be different, the images captured by the camera 132 may be similar to the images captured by the camera 137 mounted on the wall of the residence 135. In one case, the computer 131 may replicate the operations performed by of the computer 136 and validate the determination made by the computer 136.

In another case, one or more of the objects present in images captured by the camera 132 may be different than those in images captured by the camera 137. The difference may be attributable to various reasons, such as, for example, a difference in times at which the images were captured by the two cameras. The kid 155 may have retrieved the ball 156 and headed back into the residence 165 at the time images are captured by the camera 132. Consequently, the computer 131 may evaluate the images and determine that the kid 155 and the ball 156 no longer present a driving risk. Such a finding may be transmitted by the computer 131 via the NAN, to the device 116 in the vehicle 115, in the form of an updated status. The device 116 may cancel the driver alert based on evaluating the updated status information provided by the computer 131.

In yet another embodiment in according with the disclosure, a driver alert may be generated based on information obtained by a device other than the computer 131 or the computer 136. In an example scenario, a pedestrian 160 on the road 140 may observe the kid 155 playing with the ball 156 and use a smartphone 161 to capture one or more images of a scene that includes the vehicle 150, the kid 155, and/or the ball 156. The angle of view of images captured by the smartphone 161 is different than those of the images captured by captured by the camera 137 mounted on the wall of the residence 135 and the camera 132 mounted on the wall of the residence 130. These images may be evaluated by a processor contained in the smartphone 161 in a manner similar to that described above with respect to evaluation of images by the computer 136. The smartphone 161 may then transmit information via the NAN to the device 116 in the vehicle 115. In one situation, the device 116 may evaluate this information to determine whether a driver alert is to be issued. In another situation, the device 116 may evaluate this information to corroborate, validate, and/or confirm information provided by the computer 136 and/or the computer 131. Based on the evaluation, the device 116 may issue the driver alert, maintain the driver alert, or cancel the driver alert.

The driver of the vehicle 115 may respond to the driver alert issued by the device 116 in any of various ways. In one case, the driver may slow down the vehicle 115 and pay extra attention when turning left from the road 125 into the road 140. In another case, the driver may opt to drive on an alternate route inside the neighborhood 105 to his/her residence 135, such as, for example, east on the road 120, south on a road 145 and west on the road 140.

In other embodiments in according with the disclosure, a driver alert may be generated based on information obtained by various detection devices located in the neighborhood 105, such as, for example, a security camera installed in a common area and facing a road in the neighborhood 105 or a camera mounted on a roadside fixture in the neighborhood 105.

Driver alerts may also be generated based on information obtained by detection devices provided in various vehicles. For example, the device 116, which may be a camera in one scenario, may capture images of driving impediments as the vehicle 115 travels through the neighborhood. The images may be evaluated by a processor in the device 116 and information passed on to other vehicles that may be traveling inside the neighborhood. The information may be broadcast to all vehicles having devices communicatively coupled to the NAN as well as to all computers that are communicatively coupled to the NAN. The various devices and computers may generate, confirm, validate, or update the information in order to generate driver alerts based on the relevance of the information to a particular driver of a particular vehicle.

Figure 2:
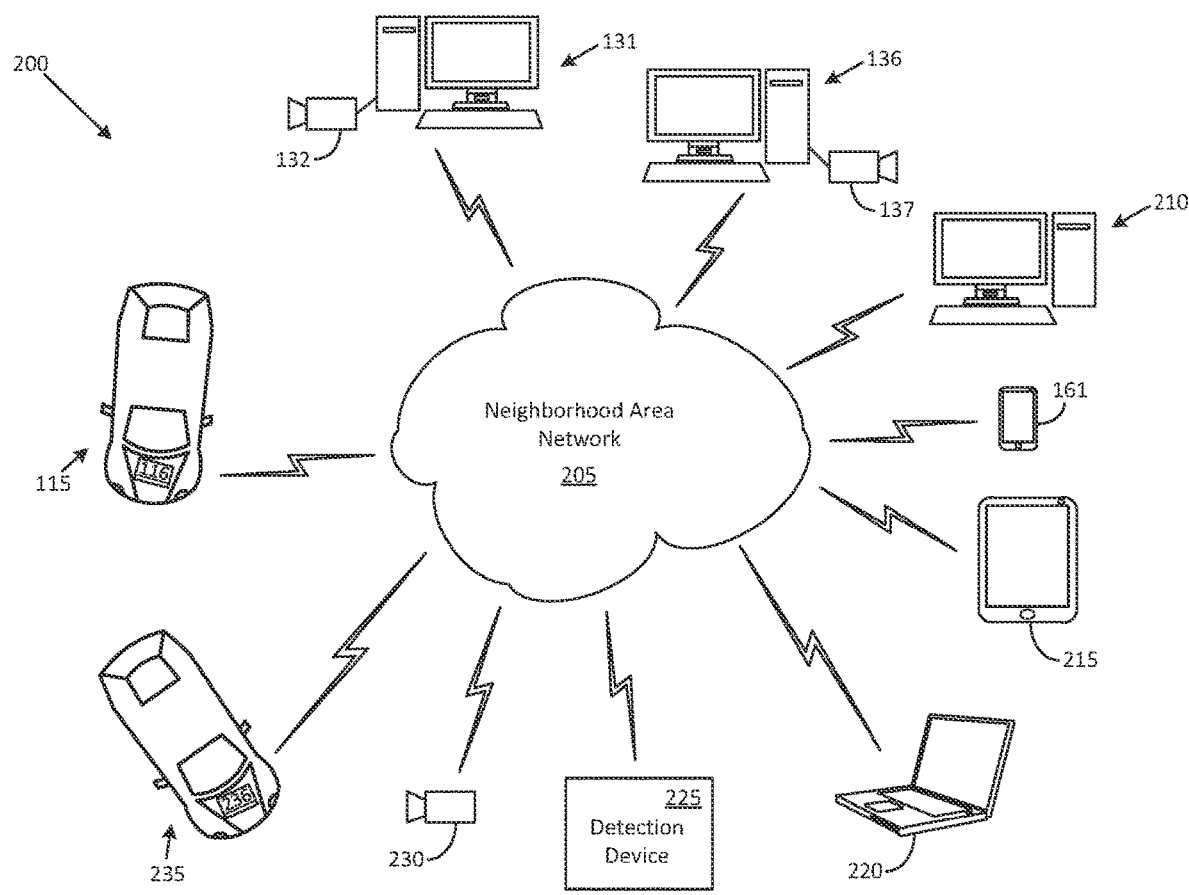
FIG. 2 illustrates a first example network system that may be employed for providing driver alerts in accordance with an embodiment of the disclosure.

FIG. 2 illustrates a first example network system 200 that may be employed for providing driver alerts in accordance with an embodiment of the disclosure. The network system 200 includes a neighborhood area network (NAN) 205 that allows various devices to wirelessly communicate with the each other and pass information back and forth in the form of digital data pertaining to various types of driving impediments in the neighborhood. Each device may be configured as a wireless node of the NAN 205 and may, in at least some implementations, utilize any of various types of wireless communication formats (WiFi, Bluetooth, cellular, etc.).

The network system 200 operates as a distributed computer network that allows various types of computing devices to interact with each other. The example devices shown in FIG. 2 include the computer 131 in the residence 130, the computer 136 in the residence 135, a computer 210 located in another residence in the neighborhood 105, the smartphone 161 of the pedestrian 160, a tablet computer 215 that may be operated by a resident of the neighborhood 105, a laptop computer 220 that may be operated by a resident of the neighborhood 105, a detection device 225 located in the neighborhood 105 (such as, for example, a vehicle speed detector mounted beside a road in the neighborhood 105), a neighborhood security camera 230 mounted on a roadside fixture in the neighborhood 105, a device 236 provided in a vehicle 235, and the device 116 provided in the vehicle 115.

The devices may be scattered throughout the neighborhood and are configured to capture information in real time (such as in the form of digital images) and to share the information with some or all of the devices. More particularly, in one implementation, the information may be broadcast in real time to all vehicles in the neighborhood.

In one case, a vehicle may capture information about a driving impediment and broadcast this information to other vehicles in the neighborhood. A device, such as, for example, the device 116 in the vehicle 115 and the device 236 in the vehicle 235 provided in each vehicle, can generate a driver alert based on evaluating the information to determine relevance to a respective driver and upon determining that the vehicle is moving inside the neighborhood. Vehicles that are parked in garages or elsewhere may refrain from providing a driver alert.

In another case, information about driving impediments may be shared selectively only among computers located in the neighborhood. and is not necessarily broadcast to all devices. Each individual computer may evaluate the information to determine relevance to a vehicle that is associated with a residence in which the computer is located. As one example of such a scenario, the detection device 225, which, in this example, is mounted near a road adjacent to a tennis court in the neighborhood may provide information to all computers regarding a car that is improperly parked in the tennis facility parking lot. The computer 136 in the residence 135 may receive the information, and upon evaluating the information, may decide that this driving impediment is irrelevant to the driver of the vehicle 115 because the driver does not travel near the tennis courts on his/her way back from work. As such, the computer 136 may opt not to transmit information regarding this driving impediment to the device 116 in the vehicle 115.

In yet another case, one of the computers that is coupled to the NAN 205 may be configured as a server computer to a number of clients (such as the devices shown in FIG. 2). The server computer may be located in the neighborhood 105 or may be located elsewhere and maintained/operated by an administrator (such as for example, a staff member of a home owners' association). The server computer may be used for various purposes, such as for administration (enrollment, legal documents, etc.) and to enforce various rules and regulations associated with driver alerts. In an exemplary mode of operation of this system, information about driving impediments may be transmitted to the server computer from each of the devices in the neighborhood that have been enrolled for driver alerts. The server computer may evaluate the information and execute actions, such as broadcasting the information to all devices, selectively transmitting the information to computers located in vehicles, or selectively transmitting the information to a specific computer located in a specific vehicle that may be appropriate for receiving a driver alert.

Figure 3:
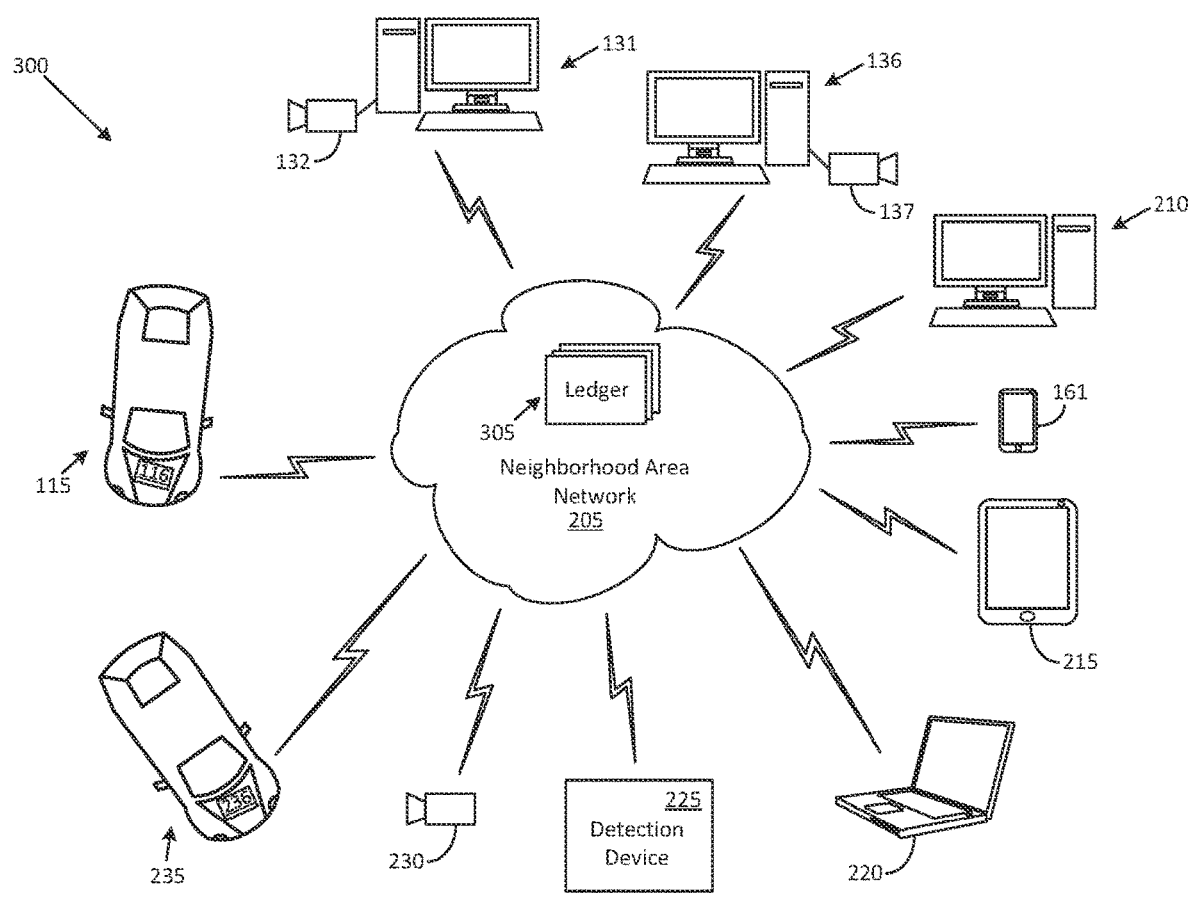
FIG. 3 illustrates a second example network system that may be employed for providing driver alerts in accordance with an embodiment of the disclosure.

FIG. 3 illustrates a second example network system 300 that may be employed for providing driver alerts in accordance with an embodiment of the disclosure. In this embodiment, the network system 300 is a peer-to-peer network that supports a distributed ledger 305. In general, the distributed ledger 305 offers a consensus of replicated, shared, and synchronized digital data geographically spread out over the neighborhood 105. There is no designated administrator or centralized data storage system.

The distributed ledger 305 may be implemented by configuring various databases of various computers in the neighborhood 105 (and/or in a cloud computing system of the NAN 205) to record data associated with driver alerts that are provided by the devices coupled to the NAN 205. Various types of algorithms may be employed to ensure that the data in the distributed ledger 305 is authentic, timely, non-redundant, and is updated in real time.

In an example implementation, information about a driving impediment may be entered into the distributed ledger 305 by a first computer, such as, for example, the computer 136 in the residence 135. The information provided by the computer 136 may be validated by information entered into the distributed ledger 305 by the computer 131 in the residence 130. Information subsequently entered into the distributed ledger 305 via the smartphone 161 of the pedestrian 160 may result in the previous information submitted by the computer 136 to be modified, deleted, or further validated.

In another example implementation, the distributed ledger 305 is configured to support a blockchain mode of operation that establishes a sequence of timestamped events associated with any driving impediment. A blockchain in this application may be generally described as a growing list of records, called blocks, which are linked using cryptography. Each block contains a cryptographic hash of the previous block, a timestamp, and transaction data. By design, a blockchain is resistant to modification of the data and allows recording of events in a verifiable and permanent manner. Timestamping of information provided by the various devices of the neighborhood 105 allows residents of the neighborhood 105 to verify a timeliness, authenticity, and originating source, of information that may be used to generate driver alerts.

In an example scenario, some or all residents of the neighborhood 105 may volunteer to create, operate, and maintain the distributed ledger 305. These residents may form a blockchain arrangement to keep the distributed ledger 305 active and current. In some cases, a resident may move away from the neighborhood 105 and the blockchain may be suitably modified to remove the resident from the blockchain and the distributed leger 305.

In another example scenario, it may be desirable to use the distributed ledger 305 to temporarily block traffic along a stretch of road or a cul-de-sac in order to carry out a social event such as, for example, a birthday party, a block party, or a holiday get-together of neighbors. An entry may be made to the distributed ledger 305 to announce the social event and divert traffic away from that location. The entry may be subsequently updated or deleted after the social event has taken place. The facility to utilize the distributed ledger 305 in this manner can provide privacy and peace of mind to the residents participating in the social event while simultaneously reducing the risk of a traffic accident in that area of the neighborhood 105. The blockchain mode of operation is merely one example technique to operate the distributed ledger 305. Various other techniques may be employed, based on various considerations and circumstances.

Figure 4:
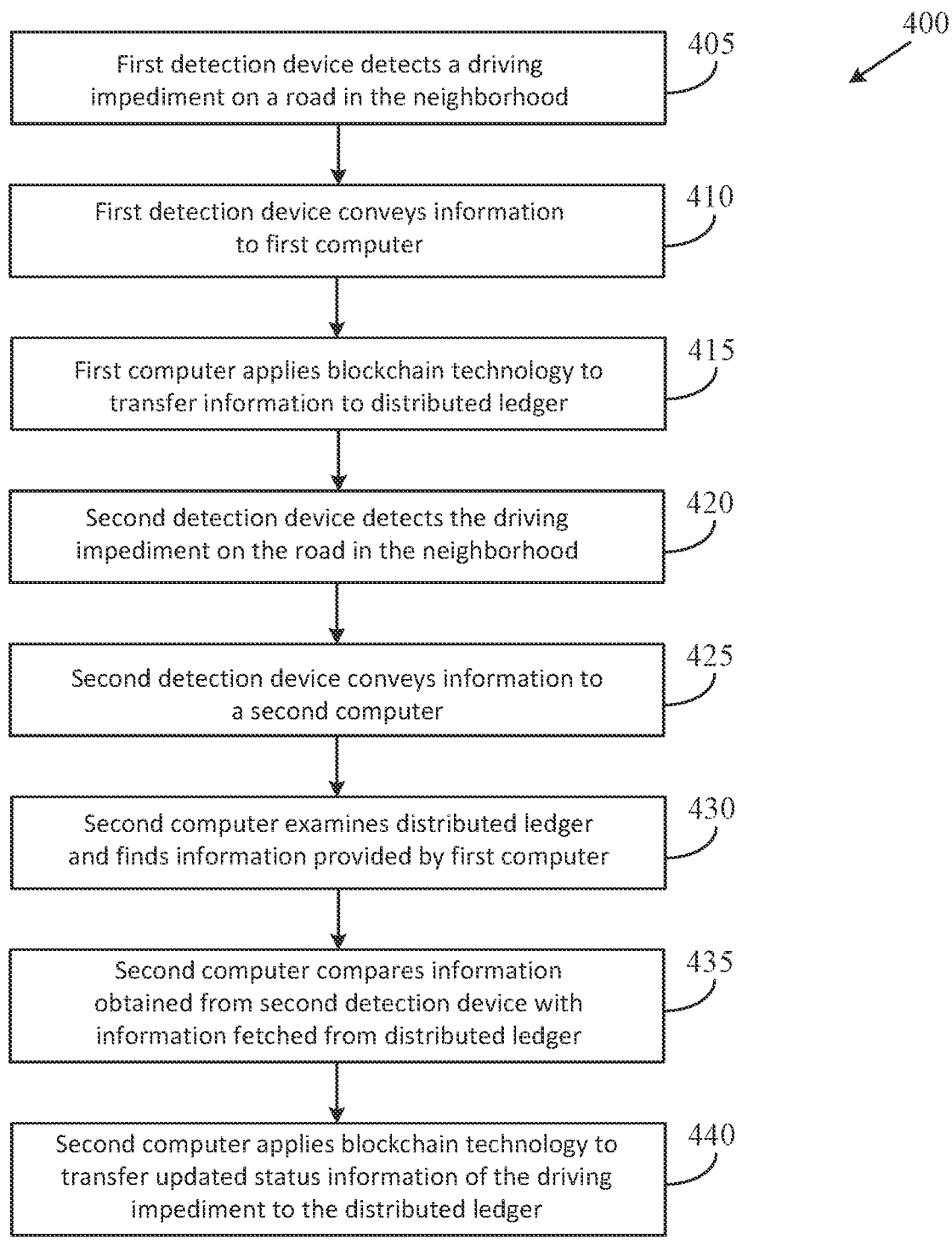
FIG. 4 shows a flowchart of a method to provide driver alerts inside a neighborhood in accordance with an embodiment of the disclosure.

FIG. 4 shows a flowchart 400 of a method to provide driver alerts in accordance with an embodiment of the disclosure. The flowchart 400 illustrates a sequence of operations that can be implemented in hardware, software, or a combination thereof. In the context of software, the operations represent computer-executable instructions stored on one or more non-transitory computer-readable media, such as a memory in a device that is coupled to the NAN 205, that, when executed by one or more processors in a device that is coupled to the NAN 205, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The description below may make reference to certain components and objects mentioned above, but it should be understood that this is done for purposes of explaining certain aspects of the disclosure and that the description is equally applicable to many other embodiments and variations in accordance with the disclosure.

At block 405, a first detection device detects a driving impediment on a road in the neighborhood. As an example of this action, the camera 137 detects the vehicle 150, the 155, and the ball on the road 140. At block 410, the first detection device conveys the information to a first computer. As an example of this action, the camera 137 conveys information about the driving impediment to the computer 136. At block 415, the first computer applies blockchain technology to transfer information to the distributed ledger. As an example of this action, the computer 136 may apply a cryptographic hash and a timestamp to the information that is conveyed to the distributed ledger 305. At block 420, a second detection device detects the driving impediment on the road in the neighborhood. As an example of this action, the camera 132 detects the vehicle 150, the 155, and the ball on the road 140. At block 425, the second detection device conveys the information to a second computer. As an example of this action, the camera 132 conveys information to the computer 131 about the driving impediment.

At block 430, the second computer may examine the distributed ledger and find the information provided by the first computer. As an example of this action, the computer 131 may examine the distributed ledger and find information provided by the computer 136. At block 435, the second computer compares the information obtained from the second detection device with the information contained in the distributed ledger. As an example of this action, the computer 131 may evaluate the information in the distributed ledger and determine that the information entered into the distributed ledger by the computer 136 is similar to the information acquired by the camera 132 or may have changed (the kid 155 may no longer be present, for example). At block 440, the second computer applies block chain technology to transfer updated status information of the driving impediment, to the distributed ledger. As an example of this action, the computer 131 may apply a cryptographic hash to the information provided by the computer 136 and apply a new timestamp pertaining to the updated status. The information may then be transferred by the computer 131 to the distributed ledger. Any device that has access to the distributed ledger can examine the entries in the distributed ledger to identify driving impediments and/or to make entries of their own. For example, the driver of the vehicle 115 may access the distributed ledger to find out if there are any driving impediments on the route between the entrance to the neighborhood 105 to his/her residence 135.

The application of blockchain technology to the procedure described above ensures that the distributed ledger provides information that is accurate and timely and also ensures that the sources of the information are identifiable and accountable, thereby providing integrity to the information.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in a system for providing driver alerts in accordance with the disclosure the geofence controller 805 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    configuring a first computer in a first vehicle as a first wireless node of a neighborhood area network of a residential neighborhood;
    configuring a second computer located inside a first residence in the residential neighborhood as a second wireless node of the neighborhood area network;
    detecting, by a first detection device, a presence of a driving impediment on a road located outside the first residence and within the residential neighborhood;
    conveying, by the first detection device, to the second computer that is inside the first residence, digital data comprising information of the driving impediment;
    determining that the first vehicle and a second vehicle are moving within the residential neighborhood;
    determining, based on a location of the driving impediment, that the digital data comprising information of the driving impediment is relevant to the first vehicle instead of the second vehicle;
    determining a first risk factor associated with the driving impediment and a first risk factor threshold, wherein the first risk factor threshold is defined by a first driver of the first vehicle;
    determining a second risk factor threshold, wherein the second risk factor threshold is defined by a second driver of the second vehicle;
    determining that the first risk factor satisfies a first risk factor threshold and fails to satisfy the second risk factor threshold;
    conveying, by the second computer located inside the first residence, to the first computer in the first vehicle instead of the second vehicle, and based on the determination that the first risk factor fails to satisfy the second risk factor threshold; the digital data comprising information of the driving impediment based on the determination that the first vehicle is moving within the residential neighborhood and the determination that the digital data comprising information of the driving impediment is relevant to the first vehicle instead of the second vehicle; and issuing, by the first computer in the first vehicle, a driver alert based on the information of the driving impediment.

2. The method of claim 1, wherein the driving impediment comprises at least one of a second vehicle, a trash receptacle, or an individual, wherein the first detection device is a first camera, and wherein the method further comprises:

receiving, by the second computer, from the first camera, a first image of the driving impediment, the first image providing a first angle of view of the driving impediment;

evaluating, by the second computer located inside the first residence, the first image to obtain information of the driving impediment;

receiving, by the second computer, from a third computer located inside a second residence in the residential neighborhood, a second image of the driving impediment, the second image providing a second angle of view of the driving impediment; and evaluating, by the second computer, the second image to validate the information obtained by evaluating the first image.

3. The method of claim 1, further comprising:

detecting, by a second detection device that is coupled to a third computer that is located inside a second residence in the residential neighborhood, an updated status of the driving impediment on the road located outside the first residence;

conveying, by the second detection device, to the third computer that is located inside the second residence, digital data comprising information of the updated status of the driving impediment;

conveying, by the third computer that is located inside the second residence, to the first computer in the first vehicle, the digital data comprising information of the updated status of the driving impediment; and providing, by the first computer in the first vehicle, to a driver of the first vehicle, information of the updated status of the driving impediment.

4. The method of claim 3, wherein information of the updated status of the driving impediment is based on one of a removal of the driving impediment from the road located outside the first residence or a confirmation that the driving impediment is still present on the road located outside the first residence.

5. The method of claim 3, wherein the neighborhood area network is configured to support a distributed computer system that includes the first computer, the second computer, and the third computer, and the method further comprises:

entering, by the second computer that is inside the first residence, into a distributed ledger of the distributed computer system, the digital data comprising information of the driving impediment; and entering, by the third computer that is inside the second residence, into the distributed ledger, the digital data comprising the updated status of the driving impediment.

6. The method of claim 5, wherein the distributed ledger is configured to support a blockchain mode of operation that establishes a sequence of timestamped events associated with the driving impediment.

7. The method of claim 3, wherein the neighborhood area network is configured to support a distributed computer system that includes the first computer, the second computer, and the third computer, and the method further comprises:

detecting, by the first computer in the first vehicle, the updated status of the driving impediment on the road located outside the first residence; and entering, by the first computer in the first vehicle, into a distributed ledger of the distributed computer system, digital data comprising the updated status of the driving impediment.

8. A method comprising:

entering, into a distributed ledger of a distributed computer system, by a first computer that is inside a first residence of a residential neighborhood, digital data comprising information of a first driving impediment on a first road located outside the first residence;

determining that a first vehicle and a second vehicle are moving within the residential neighborhood;

determining, based on a location of the first driving impediment, that the digital data comprising information of the first driving impediment is relevant to the first vehicle instead of the second vehicle;

determining a first risk factor associated with the driving impediment and a first risk factor threshold, wherein the first risk factor threshold is defined by a first driver of the first vehicle;

determining a second risk factor threshold, wherein the second risk factor threshold is defined by a second driver of the second vehicle;

determining that the first risk factor satisfies a first risk factor threshold and fails to satisfy the second risk factor threshold;

conveying, by the first computer located inside the first residence, to a second computer in the first vehicle instead of the second vehicle, and based on the determination that the first risk factor fails to satisfy the second risk factor threshold, the digital data comprising information of the first driving impediment based on the determination that the first vehicle is moving within the residential neighborhood and the determination that the digital data comprising information of the first driving impediment is relevant to the first vehicle instead of the second vehicle; and issuing, by the second computer in the first vehicle, a driver alert based on the information of the first driving impediment.

9. The method of claim 8, wherein the distributed computer system comprises a peer-to-peer network that is geographically spread out over a neighborhood, wherein the first residence is located in the neighborhood, and wherein the method further comprises:

entering, into the distributed ledger of the distributed computer system, by a third computer that is inside a second residence, digital data comprising information of an updated status of the first driving impediment.

10. The method of claim 9, wherein the updated status of the first driving impediment is based on one of a removal of the first driving impediment from the first road located outside the first residence or a confirmation that the first driving impediment is still present on the first road located outside the first residence.

11. The method of claim 9, wherein the distributed ledger is configured to support a blockchain mode of operation that establishes a sequence of timestamped events associated with the first driving impediment.

12. The method of claim 11, wherein the distributed computer system includes the first computer, the second computer, and the third computer configured as a neighborhood network system, and wherein the distributed ledger is hosted on the neighborhood network system.

13. The method of claim 9, further comprising:
entering, into the distributed ledger of the distributed computer system, by the second computer in the first vehicle, digital data comprising information of the updated status of the first driving impediment.

14. The method of claim 8, further comprising:
entering, into the distributed ledger of the distributed computer system, by a personal communication device of an individual, digital data comprising information of the first driving impediment on the first road located outside the first residence, information of an updated status of the first driving impediment on the first road located outside the first residence and/or information of a second driving impediment on a second road located outside a second residence.

15. A system comprising:
memory that stores computer-executable instructions; and
one or more processors configured to access the memory and execute the computer-executable instructions to:
configure a first computer in a first vehicle as a first wireless node of a neighborhood area network of a residential neighborhood;
configure a second computer located inside a first residence in the residential neighborhood as a second wireless node of the neighborhood area network;
detect, by a first detection device, a presence of a driving impediment on a road located outside the first residence and within the residential neighborhood;
convey, by the first detection device, to the second computer that is inside the first residence, digital data comprising information of the driving impediment;
determine that the first vehicle and a second vehicle are moving within the residential neighborhood;
determine, based on a location of the driving impediment, that the digital data comprising information of the driving impediment is relevant to the first vehicle instead of the second vehicle;
determine a first risk factor associated with the driving impediment and a first risk factor threshold, wherein the first risk factor threshold is defined by a first driver of the first vehicle;
determine a second risk factor threshold, wherein the second risk factor threshold is defined by a second driver of the second vehicle;
determine that the first risk factor satisfies a first risk factor threshold and fails to satisfy the second risk factor threshold;
convey, by the second computer located inside the first residence, to the first computer in the first vehicle instead of the second vehicle, and based on the determination that the first risk factor fails to satisfy the second risk factor threshold, the digital data comprising information of the driving impediment; and
issue, by the first computer in the first vehicle, a driver alert based on the information of the driving impediment.

16. The system of claim 15, wherein the first detection device is an imaging device configured to capture a digital image of the road outside the first residence, and wherein the digital data comprising information of the driving impediment comprises the digital image.

17. The system of claim 15, wherein the driving impediment comprises at least one of a second vehicle, a trash receptacle, or an individual.

18. The system of claim 15, further comprising:
a personal communication device of an individual, the personal communication device configured to access the distributed ledger of the distributed computer system via the neighborhood area network and to enter into the distributed ledger, information comprising the driving impediment on the road outside the first residence.

* * * * *